US010452958B2

(12) United States Patent
Jones (10) Patent No.: US 10,452,958 B2
(45) Date of Patent: Oct. 22, 2019

(54) SYSTEM AND METHOD FOR IMAGE COMPARISON BASED ON HYPERPLANES SIMILARITY

(71) Applicant: Mitsubishi Electric Research Laboratories, Inc., Cambridge, MA (US)

(72) Inventor: Michael Jones, Belmont, MA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 202 days.

(21) Appl. No.: 15/726,415

(22) Filed: Oct. 6, 2017

(65) Prior Publication Data
US 2019/0108423 A1    Apr. 11, 2019

(51) Int. Cl.
*G06K 9/00*        (2006.01)
*G06K 9/62*        (2006.01)

(52) U.S. Cl.
CPC ....... *G06K 9/6286* (2013.01); *G06K 9/00288* (2013.01); *G06K 9/6215* (2013.01); *G06K 9/6269* (2013.01)

(58) Field of Classification Search
CPC combination set(s) only.
See application file for complete search history.

(56) References Cited

U.S. PATENT DOCUMENTS 7,599,512 B2    10/2009    Shimizu et al.
8,224,042 B2*    7/2012    Wang ................. G06K 9/00275
                                                                 382/118

(Continued)

FOREIGN PATENT DOCUMENTS

WO    2007070370 A2    6/2007
WO    2016181400 A1    11/2016

OTHER PUBLICATIONS

Wie-An Lin et al:"A proximity-Aware Hierarchical Clustering of Faces" (Year: 2017).*

(Continued)

*Primary Examiner* — Solomon G Bezuayehu
(74) *Attorney, Agent, or Firm* — Gennadiy Vinokur; James McAleenan; Hironori Tsukamoto (57) ABSTRACT

An image processing system includes a memory to store data indicative of benchmark feature vectors of benchmark images, an input interface to accept data indicative of a first feature vector of a first image and a second feature vector of a second image, and an output interface to render a similarity value between the first and the second images. The system includes a processor to determine the similarity using a first hyperplane separating the benchmark feature vectors from the first feature vector and a second hyperplane separating the benchmark feature vectors from the second feature vector. The processor determines a first normal vector to the first hyperplane as the difference between the first feature vector and the mean of the benchmark feature vectors. The processor determines an offset for the first hyperplane as the average of the maximum inner product of the benchmark feature vectors with the first normal vector and the inner product of the first feature vector with the first normal vector. The processor determines the similarity value as a function of a sum of a signed distance of the second feature vector to the first hyperplane and a signed distance of the first feature vector to the second hyperplane.

15 Claims, 9 Drawing Sheets

(56) References Cited

U.S. PATENT DOCUMENTS

| | | | | |
|---|---|---|---|---|
| 2002/0054694 | A1* | 5/2002 | Vachtsevanos | G01N 21/956 382/111 |
| 2003/0128877 | A1* | 7/2003 | Nicponski | G06K 9/00221 382/224 |
| 2003/0200188 | A1* | 10/2003 | Moghaddam | G06K 9/6256 706/25 |
| 2006/0133641 | A1* | 6/2006 | Shimizu | G06K 9/46 382/100 |
| 2011/0206237 | A1* | 8/2011 | Saruta | G06K 9/4661 382/103 |
| 2016/0034821 | A1* | 2/2016 | Konoshima | G06F 17/18 706/52 |
| 2016/0042253 | A1* | 2/2016 | Sawhney | G06F 16/50 382/190 |
| 2017/0060904 | A1* | 3/2017 | Pau | G06F 16/5838 |
| 2017/0228376 | A1 | 8/2017 | Noma | |
| 2017/0262552 | A1* | 9/2017 | Noma | G06F 16/90335 |

OTHER PUBLICATIONS

Pitelis et al., "Discriminant Subspace Learning Based on Support Vectors Machines," P. Perner (Ed.): MLDM 2012, LNAI 7376, pp. 198-212, 2012. c Springer-Verlag Berlin Heidelberg 2012.

Parkhi, O.M., Vedaldi, A., Zisserman, A.: Deep face recognition. In: Proceedings of the British Machine Vision, vol. 1, No. 3, p. 6 (2015).

F. Schroff, D. Kalenichenko, and J. Philbin. Facenet: A unified embedding for face recognition and clustering. In Proceedings of the IEEE Conference on Computer Vision and Pattern Recognition, pp. 815-823, 2015.

Lin et al., "A Proximity Aware Hierarchical Clustering of Faces," Arxiv.org, Cornell University Library, 201 Olin Library, NY, 14853. Mar. 15, 2017.

Anonymous, "Perceptron Wikipedia," Aug. 31, 2017. retrieved from the internet, https://web.archive.org/web/20170831213150/ https://en.wikipedia.org/wiki/Perceptron. retrieved Jul. 10, 2018.

* cited by examiner

SYSTEM AND METHOD FOR IMAGE COMPARISON BASED ON HYPERPLANES SIMILARITY

TECHNICAL FIELD

This invention relates generally to computer vision, and more particularly to determining a similarity of images.

BACKGROUND

In many computer vision applications, such as camera surveillance and face recognition, it is necessary to determine whether persons, or other objects represented in different images are the same or not. In the art, this is known as person re-identification when the images selected for comparison are images of full bodies or face recognition when the images selected for comparison are images of faces. To that end, a person re-identification and/or a face recognition system is a computer application capable of identifying or verifying a person from a digital image or a video frame from a video source. One of the ways to do this is by comparing selected image features computed from two images of two people's bodies or faces.

The images can be cropped regions in still images or cropped regions in frames in a video that contain all or a part of a body of a person. In surveillance and other applications in which persons are tracked by video cameras, the problem of determining whether different tracks are of the same person naturally arises. The tracks may be from different points in time, from the same video camera, or from two different video cameras. This problem can be solved by comparing the two cropped image regions and determining whether the regions represent the same person or not.

In recent years a deep convolutional neural network (CNN) architecture for face recognition has emerged that achieves practical accuracy on various difficult test sets. The architecture takes a cropped face image as input and uses a strong baseline CNN such as VGG or ResNet to compute a feature vector followed by a fully connected layer that outputs a vector of length C where C is the number of unique identities in the training set. The network is trained to minimize the softmax loss between the output vector and a one-hot encoding of the correct identity for the input face image. In other words, the CNN learns to directly predict the identity of the input face by first computing a distinctive feature vector representing the identity of the face. After training, the final fully connected layer that gives the probability of each training identity is discarded since the training identities are not the same as the identities encountered during testing. Instead, the output of the layer before the final fully connected layer is used as an identity-specific feature vector. Feature vectors for two testing face images are L2 normalized and compared by simply using L2 distance (or cosine similarity).

Despite the good results achieved with this basic architecture, there is a fundamental mismatch between how the network is trained and how it is used during testing. To that end, several methods address this mismatch by using different loss functions for training. For example, one alternative loss functions are the triplet loss described by F. Schroff, D. Kalenichenko, and J. Philbin. Facenet: A unified embedding for face recognition and clustering. In Proceedings of the IEEE Conference on Computer Vision and Pattern Recognition, pages 815-823, 2015. The triplet loss takes an "anchor" face as well as positive and negative example images of the anchor's identity as an input example and attempts to minimize the distance between the anchor and positive feature vectors minus the distance between the anchor and negative feature vectors. One difficulty with this loss is that the number of triples of face images for training becomes very large and some kind of hard-negative mining is needed.

Another loss function, known as contrastive loss, has a similar effect to the triplet loss using a slightly different loss function. Another loss function, known as the center loss attempts to minimize the distance between a face's feature vector and the mean feature vector for the class (the set of face images for a particular person). Using center loss plus softmax loss tends to yield clusters of feature vectors for each person that are compact and separable from other identities.

Three other related loss functions, A-softmax (for angular softmax), large-margin softmax and L2-constrained softmax modify the standard softmax loss function in a way that encourages feature vectors of a particular identity to cluster near each other. All of these various loss functions have their advantages and disadvantages.

SUMMARY

It is an object of some embodiments to provide a system and a method suitable for image comparison. It is another object of some embodiments to provide such a method that can be implemented with the help of neural networks. It is another object of some embodiments to address an online/offline mismatch between how a neural network is trained with a loss function and how that neural network is used during testing.

Some embodiments are based on recognition that the images can be compared directly and/or indirectly. For example, the direct comparison of two images can be performed by determining distance, e.g., L2 distance, between feature vectors of those two images. However, in some applications, such a direct comparison is undesirable. On the other hand, the two images can be compared indirectly by comparing those images against a common benchmark. If the benchmarks are determined correctly, when results of the benchmark comparison are similar, the two images are similar as well.

Some embodiments are based on realization that in the field of image comparison and/or face recognition, additionally or alternatively to changing the loss function used for training the neural network, the online/offline mismatch can be addressed by changing a distance function used to compare feature vectors. Specifically, some embodiments are based on intuition that during testing in which feature vectors are compared using L2 distance, the assumption is that feature vectors for same face pairs are close in feature space while feature vectors for different-face pairs are farther apart. However, this property is not being optimized during training of the neural network. In contrast, the property that is being optimized during the training of the neural networks is that feature vectors for a particular person are linearly separable from feature vectors for all other people. Hence, the direct comparison of the feature vectors of the two images can be suboptimal.

For example, during training, for final output unit $O_i$, the weights of the last fully connected layer of the network connected to $O_i$ learn a linear function that tries to map feature vectors for images of person i to 1 and feature vectors for images of all other people to −1. This means that the weights of the last fully connected layer define a separating hyperplane between images of person i and images of all other people. This also implies that the feature vectors learned by the network have the property that the feature vectors for images of a particular identity are linearly separable from the feature vectors of all other people. These feature vectors do not necessarily have the property that the feature vectors for a particular identity are all close together. However, the similarity function that is usually used between two feature vectors is negative L2 distance which means that two feature vectors that come from two images of the same person should have small L2 distance (i.e., be close together). However, this is not what the neural network is being trained for. Having each class of face images be linearly separable from all other classes does not imply that all the feature vectors for a class have small L2 distance.

To that end, one solution to the online/offline mismatch problem is to compare the feature vectors according to their distance to hyperplanes that separate one image's feature vectors from feature vectors of all other images. The hyperplane comparison uses feature vectors for a set of benchmark images different from any of the images for comparison to compute and compare hyperplanes between the benchmark images and the input images for the comparison. The sum of the margins to these hyperplanes from the input image feature vectors can then be used in place of L2 distance. This solution is in accordance with the training loss. Thus, there is a need for a method of comparing feature vectors representing images of faces that uses the same distance that is being used during training.

However, while the advantage of the hyperplane similarity is accuracy, the main drawback is speed. One method to estimate the hyperplane is to use a linear support vector machine (SVM) solver, but this is much slower than using L2 distance. To address this drawback, there is a need for a method to compute a separating hyperplane that does not involve SVM optimization.

Some embodiments are based on intuition that for many distributions of positive and negative feature vectors, the vector pointing from the mean of the negative feature vectors to the mean of the positive feature vectors is approximately normal to a separating hyperplane. Therefore, the normal of the separating hyperplane can be approximated with the difference between the mean positive feature vector and the mean negative feature vector. In such a manner, some embodiments instead of determining a hyperplane between the feature vector of an input image and a set of benchmark images determine the hyperplane or at least a normal to the hyperplane between the feature vector of the input image and a mean of the feature vectors of benchmark images.

When the normal for the separating hyperplane is determined, the hyperplane can be defined by the offset which tells the position along the normal that best separates the feature vector of the input image from benchmark feature vectors. To that end, one embodiment determines the offset as falling between the inner product of the feature vector of the input image and the normal vector and one of the inner products of the feature vectors of the benchmark images and the normal vector. For example, the offset of the hyperplane can be determined by computing the inner product of each feature vector of the benchmark images with the normal vector. The offset is then set to the average of the maximum benchmark inner product and the inner product of the feature vector of the input image with the normal vector.

Accordingly, one embodiment discloses a system for image comparison including a memory to store data indicative of feature vectors of test images; an input interface to accept data indicative of a first feature vector of a first image and a second feature vector of a second image, wherein the test images do not include the first image and the second image; a processor to compare a first hyperplane separating the feature vectors of test images from the first feature vector with a second hyperplane separating the feature vectors of test images from the second feature vector to produce a similarity value between the first and the second images, and an output interface to render the similarity value.

In this embodiment, the processor is configured to determine a first normal vector to the first hyperplane as the difference between the first feature vector and the mean of the feature vectors of the test images; determine an offset of the first hyperplane as a scalar defined by the average of the maximum inner product of the feature vectors of the benchmark images onto the first normal vector and the inner product of the first feature vector onto the first normal vector; and determine the similarity value as a function of a signed distance of the second feature vector to the first hyperplane;

In some implementations, the second hyperplane is determined in a manner similar to the determination of the first hyperplane. For example, in some implementations, the processor is further configured to determine a second normal vector to the second hyperplane as the difference between the second feature vector and the mean of the feature vectors of the test images; determine an offset of the second hyperplane as a scalar defined by the average of the maximum inner product of the feature vectors of the benchmark images with the second normal vector and the inner product of the second feature vector onto the second normal vector; and determine the similarity value as a function of a signed distance of the first feature vector to the second hyperplane.

Alternatively, the second hyperplane can be predetermined using, e.g., a linear support vector machine (SVM) solver. Additionally, or alternatively, in some implementations, the processor determines a similarity value as a sum of the signed distance of the second feature vector to the first hyperplane and a signed distance of the first feature vector to the second hyperplane In some implementations, the processor uses a neural network to produce the features of the first image, the features of the second image and/or the features of the negative images. In such a manner, an online/offline mismatch between training and using a neural network is reduced without sacrificing the efficiency of image comparison. The neural network in combination with hyperplane comparison provide accurate result based on joined accuracy of feature determination and feature comparison.

Accordingly, one embodiments discloses an image processing system, including a memory to store data indicative of benchmark feature vectors of benchmark images; an input interface to accept data indicative of a first feature vector of a first image and a second feature vector of a second image, wherein the benchmark images do not include the first image and the second image; a processor to determine a similarity value between the first and the second images using a first hyperplane separating the benchmark feature vectors from the first feature vector and a second hyperplane separating the benchmark feature vectors from the second feature vector, wherein the processor is configured to determine a first normal vector to the first hyperplane as the difference between the first feature vector and the mean of the benchmark feature vectors; determine an offset for the first hyperplane as the average of the maximum inner product of the benchmark feature vectors with the first normal vector and the inner product of the first feature vector with the first normal vector; and determine the similarity value as a function of a sum of a signed distance of the second feature vector to the first hyperplane and a signed distance of the first feature vector to the second hyperplane; and an output interface to render the similarity value.

Another embodiment discloses an image processing method, wherein the method uses a processor coupled to a memory storing data indicative of benchmark feature vectors of benchmark images, wherein the processor is coupled with stored instructions implementing the method, wherein the instructions, when executed by the processor carry out at least some steps of the method. The method includes accepting data indicative of a first set of feature vectors of a first set of images and a second set of feature vectors of a second set of images, wherein the benchmark images do not include the first set of images and the second set of images; comparing a first hyperplane separating the benchmark feature vectors from the first set of feature vectors with a second hyperplane separating the benchmark feature vectors from the second set of feature vectors to produce a similarity value between the first and the second set of images, wherein the comparing comprises determining a first normal vector to the first hyperplane as difference between the mean of the first set of feature vectors and the mean of the benchmark feature vectors; determining an offset for the first hyperplane as an average of the maximum inner product of the benchmark feature vectors with the first normal vector and the minimum inner product of the feature vectors from the first set of feature vectors with the first normal vector; and determining the similarity value as a function of an average signed distance of the all feature vectors in the second set of feature vectors to the first hyperplane; and rendering the similarity value.

Yet another embodiment discloses a non-transitory computer readable storage medium embodied thereon a program executable by a processor for performing a method. The method includes accepting data indicative of a first set of feature vectors of a first set of images, a second set of feature vectors of a second set of images, and benchmark feature vectors of benchmark images, wherein the benchmark images do not include the first set of images and the second set of images; comparing a first hyperplane separating the benchmark feature vectors from the first set of feature vectors with a second hyperplane separating the benchmark feature vectors from the second set of feature vectors to produce a similarity value between the first and the second set of images; and rendering the similarity value. The comparing includes determining a first normal vector to the first hyperplane as difference between the mean of the first set of feature vectors and the mean of the benchmark feature vectors; determining an offset for the first hyperplane as an average of the maximum inner product of the benchmark feature vectors with the first normal vector and the minimum inner product of the feature vectors from the first set of feature vectors with the first normal vector; and determining the similarity value as a function of an average signed distance of the all feature vectors in the second set of feature vectors to the first hyperplane.

DETAILED DESCRIPTION

Figure 1:
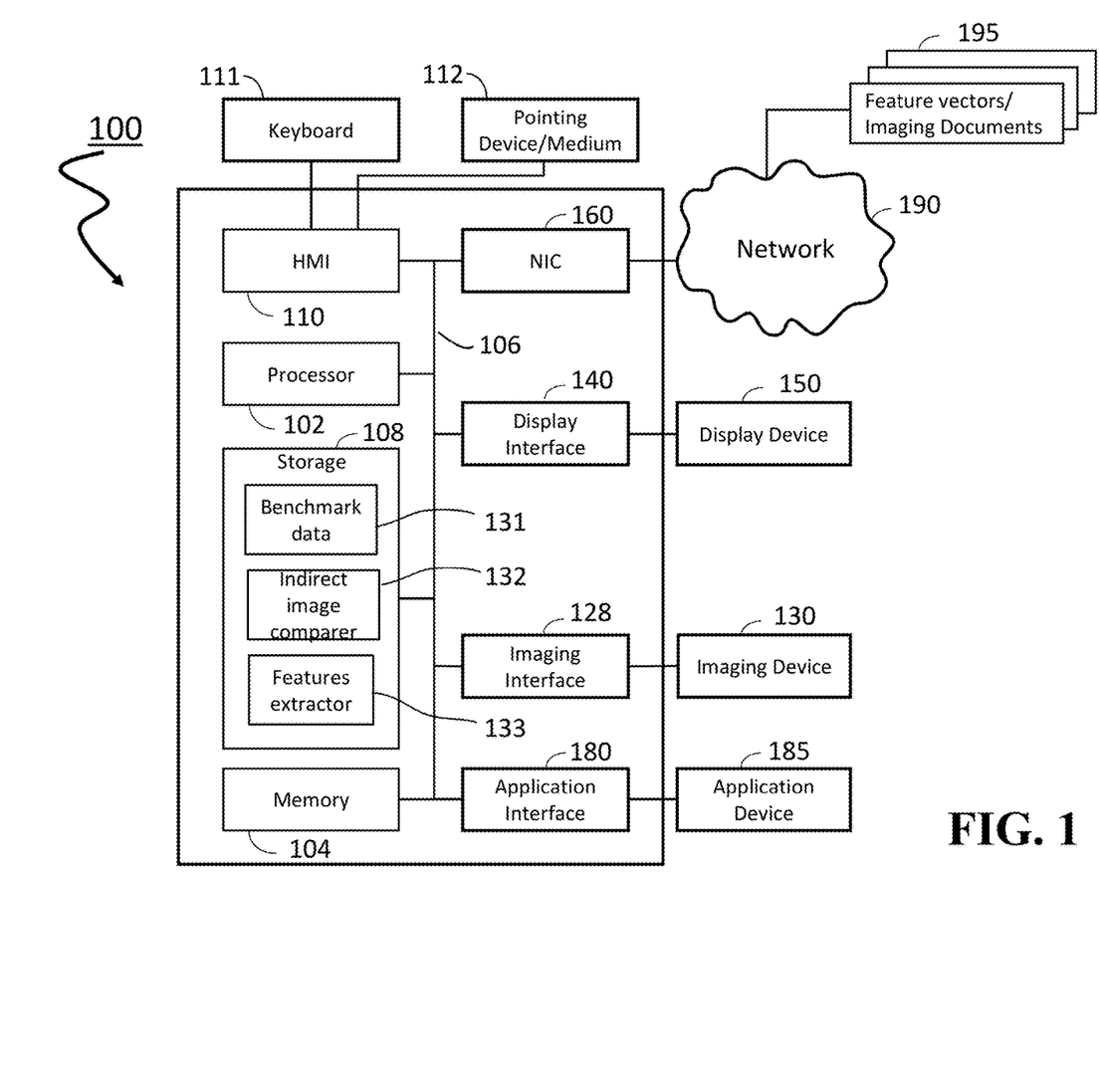
FIG. 1 shows a block diagram of an image processing system for indirect image comparison in accordance with some embodiments.

FIG. 1 shows a block diagram of an image processing system 100 for indirect image comparison in accordance with some embodiments. The image processing system 100 includes a processor 102 configured to execute stored instructions, as well as a memory 104 that stores instructions that are executable by the processor. The processor 102 can be a single core processor, a multi-core processor, a computing cluster, or any number of other configurations. The memory 104 can include random access memory (RAM), read only memory (ROM), flash memory, or any other suitable memory systems. The processor 102 is connected through a bus 106 to one or more input and output devices.

These instructions implement a method for indirect image comparison based on comparing feature vectors of the images against a common benchmark. In various embodiments, the indirect image comparison produces a similarity value indicating the degree of similarity of the compared images. For example, in one embodiment the images are the cropped images of faces or whole bodies thereby making the system a face recognition system and/or a person re-identification system.

The image processing system 100 is configured to performed indirect image comparison based on comparing the images against the common benchmark. To that end, the image processing system 100 can also include a storage device 108 adapted to store the benchmark data 131 indicative of feature vectors of benchmark images, a feature extractor 133 for extracting features of the compared images, and an indirect image comparer for comparing images indirectly by determining their similarity or dissimilarity with the benchmark data 131. The storage device 108 can be implemented using a hard drive, an optical drive, a thumbdrive, an array of drives, or any combinations thereof.

A human machine interface 110 within the image processing system 100 can connect the system to a keyboard 111 and pointing device 112, wherein the pointing device 112 can include a mouse, trackball, touchpad, joy stick, pointing stick, stylus, or touchscreen, among others. The image processing system 100 can be linked through the bus 106 to a display interface 140 adapted to connect the image processing system 100 to a display device 150, wherein the display device 150 can include a computer monitor, camera, television, projector, or mobile device, among others.

The image processing system 100 can also be connected to an imaging interface 128 adapted to connect the system to an imaging device 130. In one embodiment, the image for comparison is received from the imaging device. The imaging device 130 can include a camera, computer, scanner, mobile device, webcam, or any combination thereof.

A network interface controller 160 is adapted to connect the image processing system 100 through the bus 106 to a network 190. Through the network 190, the images 195 including one or combination of the feature vectors and imaging input documents can be downloaded and stored within the computer's storage system 108 for storage and/or further processing.

In some embodiments, the image processing system 100 is connected to an application interface 180 through the bus 106 adapted to connect the image processing system 100 to an application device 185 that can operate based on results of image comparison. For example, the device 185 is a protected system allowing its access to the users based on the face recognition results.

Some embodiments are based on recognition that the images can be compared directly and/or indirectly. For example, the direct comparison of two images can be performed by determining distance, e.g., L2 distance, between feature vectors of those two images. As used herein, a feature vector is an ordered list of numbers representing various properties of an image. In some embodiments, the feature vectors are determined by the feature extractor 133. Examples of the feature extractor include a scale-invariant feature transform (SIFT) and neural networks. However, in some applications, such a direct comparison is undesirable. On the other hand, the two images can be compared indirectly by comparing those images against a common benchmark. If the benchmark images are determined correctly, when results of the benchmark comparison are similar, the two images are similar as well.

Figure 2:
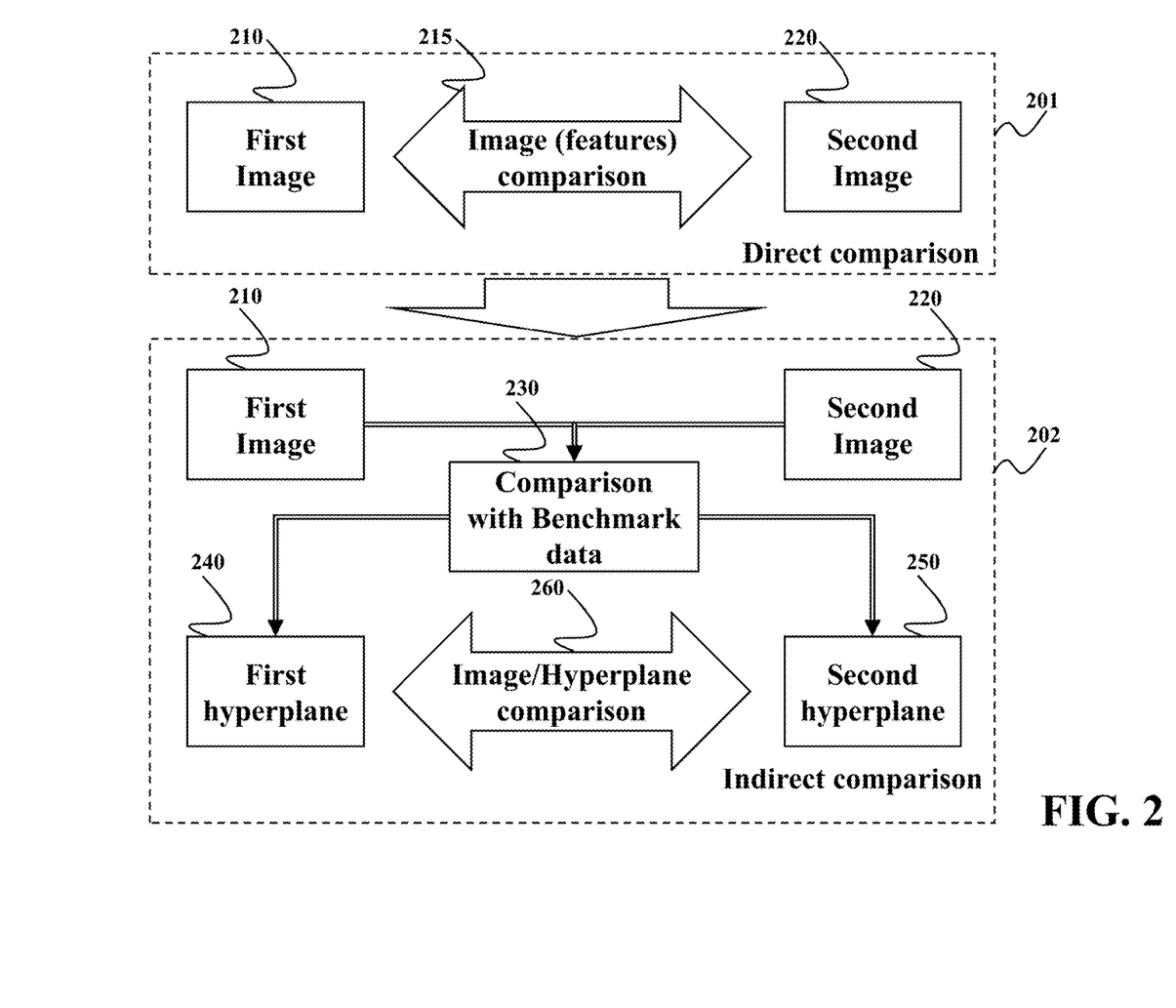
FIG. 2 shows a schematic of direct and indirect image comparison used by some embodiments.

FIG. 2 shows a schematic of direct and indirect image comparison used by some embodiments. During the direct comparison 201, a first image 210 is directly compared with a second image 220. For example, the direct comparison determines 215 a distance between features of the first and the second images. If the distance is small, the images 210 and 220 are similar; otherwise, the images 210 and 220 are different.

During the indirect comparison 202, the first image 210 and the second image 220 are compared 230 against a common benchmark. For example, in some embodiments, the benchmark data 131 is the data indicative of feature vectors of images that do not include the first image and the second image. Those images are referred herein as benchmark images and their feature vectors are referred as benchmark feature vectors. For example, the benchmark data 131 can include the benchmark images and the benchmark feature vectors of those benchmark images are extracted during the operation of the system 100. Additionally, or alternatively, the benchmark data 131 can stored the benchmark feature vectors predetermined in advance.

The result of such a comparison against a common benchmark is a first hyperplane 240 separating the benchmark feature vectors from the feature vector of the first image 210 and a second hyperplane 250 separating the benchmark feature vectors from the feature vector of the second image 220. In geometry a hyperplane is a subspace of one dimension less than its ambient space. If a space is 3-dimensional then its hyperplanes are the 2-dimensional planes, while if the space is 2-dimensional, its hyperplanes are the 1-dimensional lines. In this case, the dimensionality of the space is defined by the dimensionality of feature vector. For instance, a hyperplane of an n-dimensional feature space is a flat subset with dimension n−1. By its nature, the hyperplane separates the space into two half spaces. In such a manner, the similarity between the first and the second image can be determined indirectly based on the similarities of their hyperplanes.

For example, the sum of the margins to these hyperplanes from the feature vectors of the first and/or second images can then be used in place of L2 distance. Notably, the system 100 can perform standalone indirect image comparison or both the direct and indirect image comparison to improve the quality of the result. For example, some embodiments determine a similarity between the first and the second images as a function of a signed distance of the feature vector of the second image to the first hyperplane. For example, in some implementations, the similarity metric is determined as a sum of the signed distance of the feature vector of the second image to the first hyperplane and a signed distance of the feature vector of the first image to the second hyperplane.

However, while the advantage of the hyperplane similarity is accuracy, the main drawback is speed. One method to estimate the hyperplane is to use a linear support vector machine (SVM) solver, but this is much slower than using L2 distance. To address this drawback, there is a need for a method to compute a separating hyperplane that does not involve SVM optimization.

Some embodiments are based on intuition that for many distributions of positive and negative feature vectors, the vector pointing from the mean of the negative feature vectors to the mean of the positive feature vectors is approximately normal to a separating hyperplane. Therefore, the normal of the separating hyperplane can be approximated with the difference between the mean positive feature vector and the mean negative feature vector.

Figure 3:
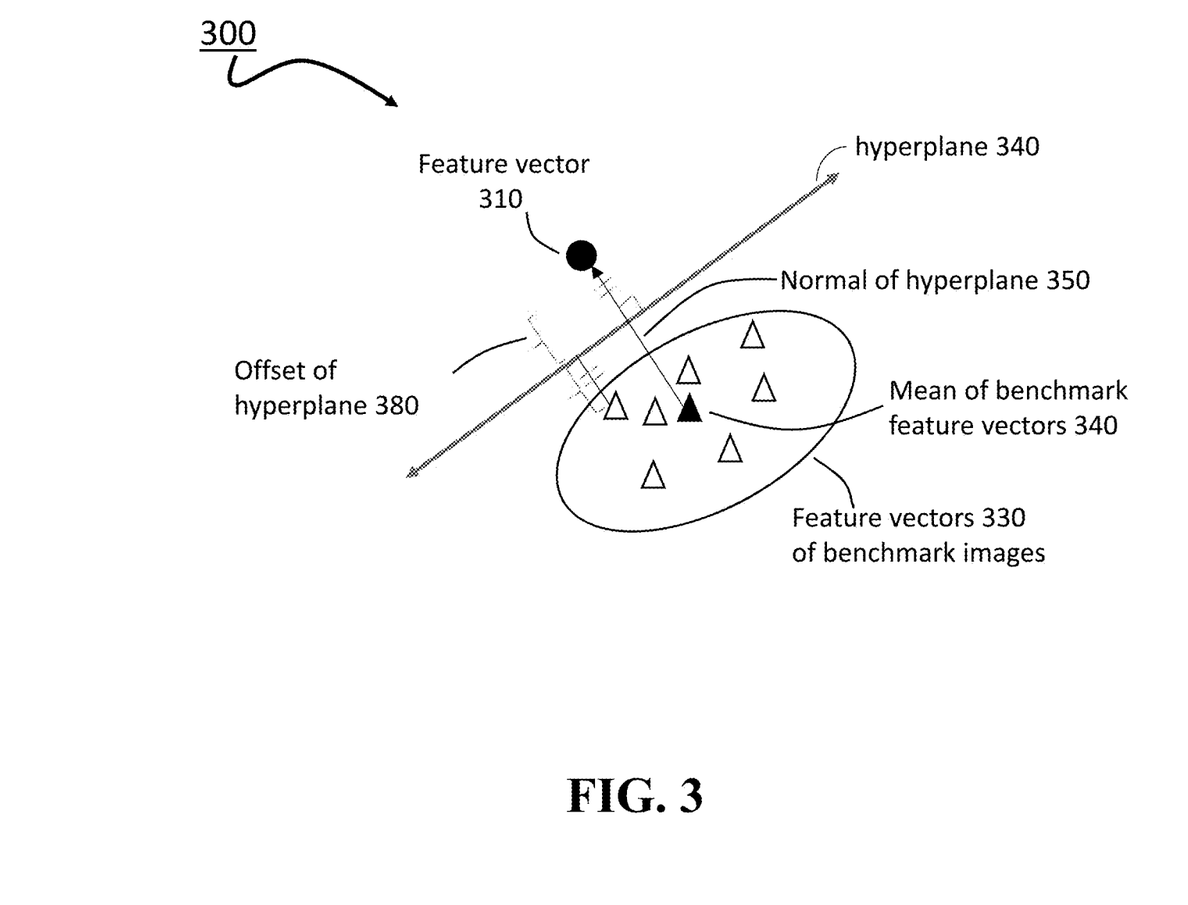
FIG. 3 shows a schematic of a hyperplane partitioning a feature space of the images to separate a feature vector from feature vectors of benchmark images according to some embodiments.

FIG. 3 shows a schematic of a hyperplane 340 partitioning a feature space 300 of the images to separate a feature vector 310 from feature vectors 330 of benchmark images according to some embodiments. The embodiments are based on recognition that a normal vector 350 and an offset scalar 380 define a hyperplane. The hyperplane is defined as the feature vectors for which the inner product with the normal vector minus the offset is 0. Some embodiments determine the normal vector 350 as the difference between the feature vector 310 and the mean 340 of the feature vectors 330 of benchmark images. As used herein, the mean is the sum of the feature vectors of benchmark images divided by the number of feature vectors. In such a manner, the normal vector can be determined very rapidly as compared to determining it through the use of an SVM solver.

The embodiments determine an offset scalar 380 as the average of the inner product of the feature vector 310 with the normal vector 350 and the maximum inner product of each of the benchmark feature vectors 330 with the normal vector 350. The normal vector 350 is chosen as the vector from the mean benchmark feature vector 340 to the feature vector of an input image 310 because inner products of the normal vector 350 with the feature vector of the input image 310 and similar feature vectors generally have larger values than inner products of the normal vector 350 with benchmark feature vectors 330. If the feature vector of the input image 310 is considered a "positive" feature vector and feature vectors of the benchmark images 330 are considered negative feature vectors, then the offset 380 is chosen to lie in the middle of the smallest inner product for positive feature vectors and the largest inner product for negative feature vectors.

Figure 4:
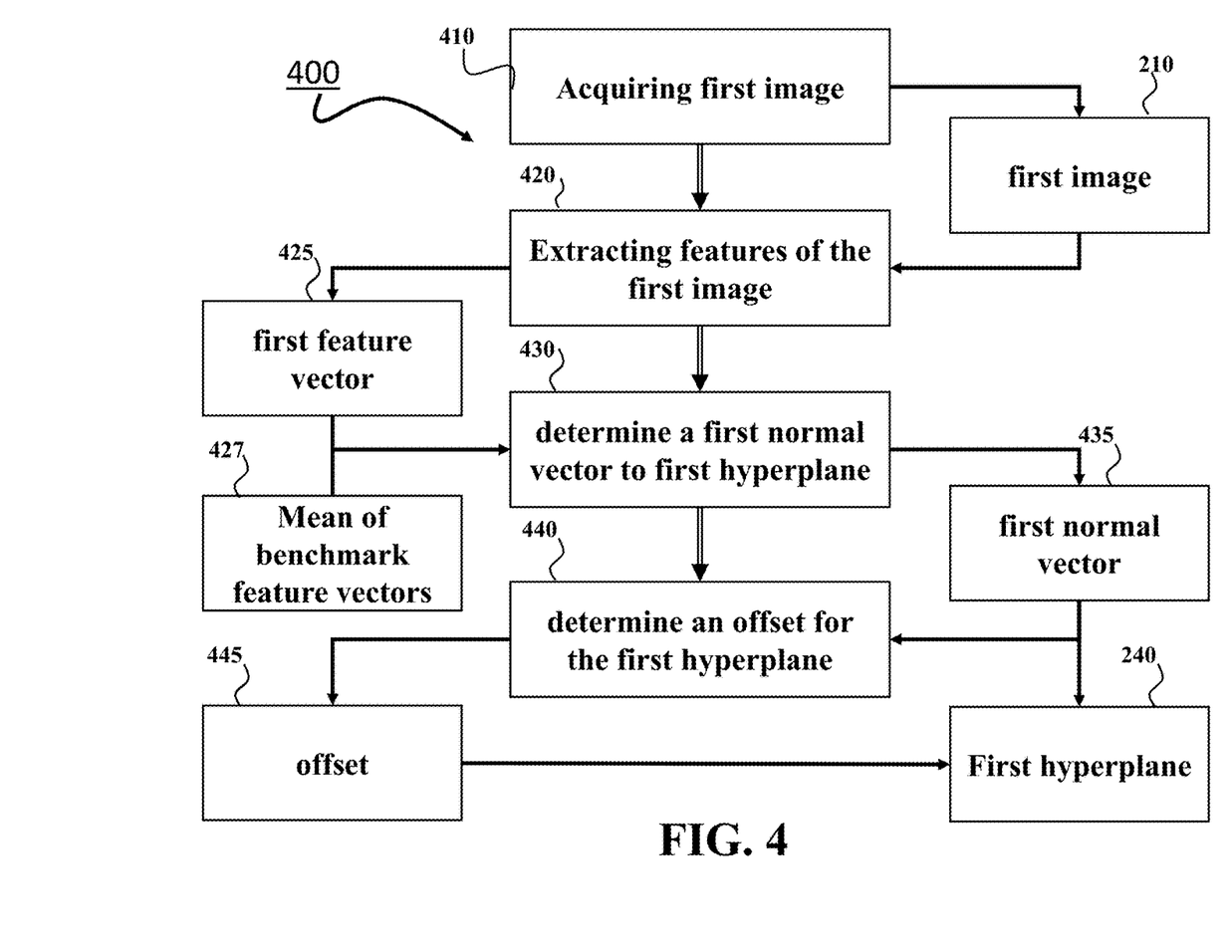
FIG. 4 shows a flow chart of a method for determining a first hyperplane for indirect image comparison of a first image according to one embodiment.

FIG. 4 shows a flow chart of a method 400 for determining a first hyperplane for indirect image comparison of a first image 210 according to one embodiment. The method acquires 410 the first image 210 and extracts 420 the features of the first image to produce the feature vector 425. For example, the method can receive the first image from the imaging device 130 and/or through the network 190. For example, the method can determine the first feature vector using the feature extractor 133. Examples of techniques used by the feature extractor include neural network including convolutional neural networks as well as hand-crafted image features such as local binary patterns or Haar-like features.

The method determines a first normal vector 435 to the first hyperplane as the difference between the first feature vector and the mean 427 of the benchmark feature vectors. The mean 427 can be precomputed in advance or determine in real time by averaging elements of the benchmark feature vectors. The method determines an offset 445 for the first hyperplane as the average of the maximum inner product of the benchmark feature vectors with the first normal vector and the inner product of the first feature vector with the first normal vector. The offset is chosen to maximize the distance between the closest benchmark feature vector to the hyperplane and the distance between the first feature vector and the hyperplane. In such a manner, the first normal vector 435 and the offset 445 defines the first hyperplane 240.

In some embodiments, the second hyperplane 250 is predetermined using a linear support vector machine (SVM) solver. Additionally, or alternatively, the second hyperplane 250 can be determined using principles of the method 400.

Figure 5:
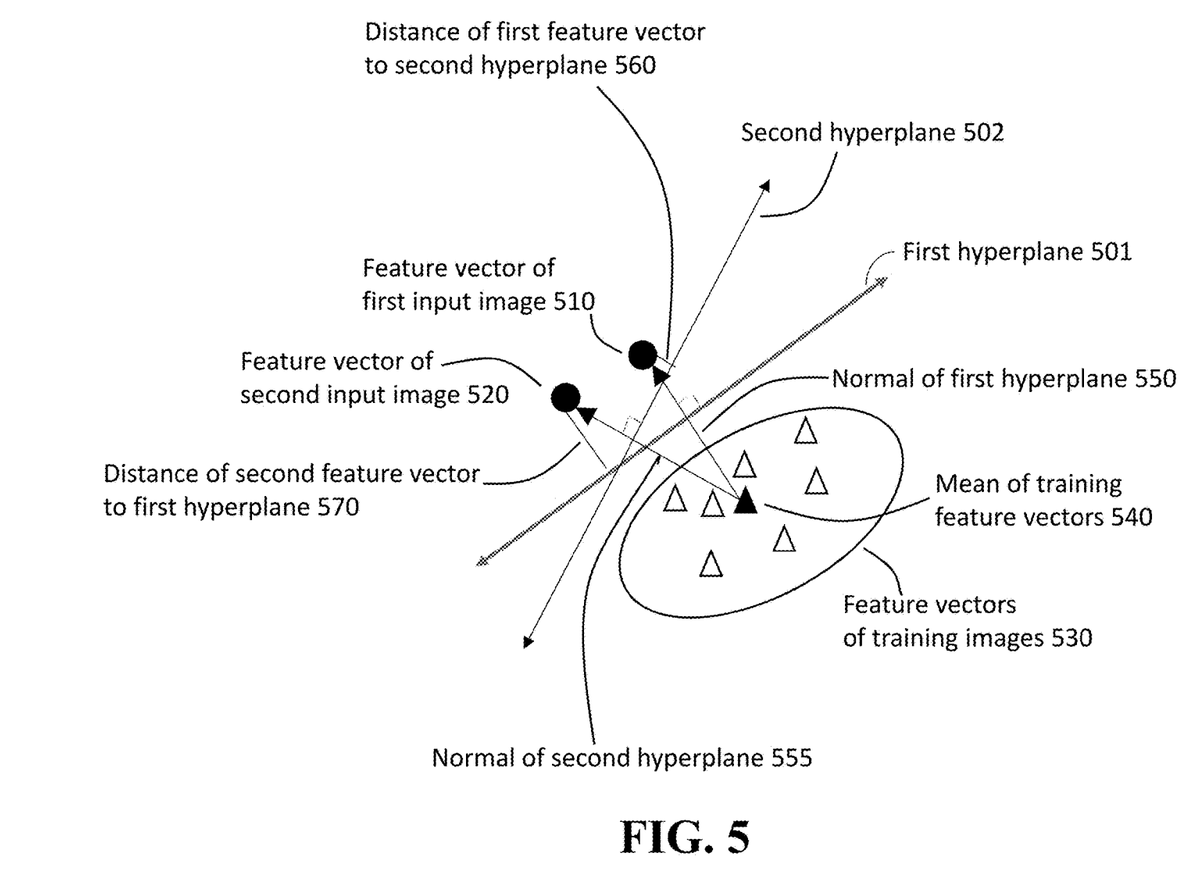
FIG. 5 shows a schematic of determining similarity of two images based on some embodiments.

FIG. 5 shows a schematic of determining similarity of two images based on some embodiments. For example, some embodiments determine the similarity value as a function of a sum of a signed distance 570 of the second feature 520 vector to the first hyperplane 501 and a signed distance 560 of the first feature vector 510 to the second hyperplane 502. For example, the signed distance of a feature vector to a hyperplane is computed as the inner product of the feature vector with the normal of the hyperplane minus the offset of the hyperplane. This distance is positive when the feature vector is on the positive side of the hyperplane and negative of the negative side of the hyperplane (the side containing the mean of the training feature vectors).

Figure 6:
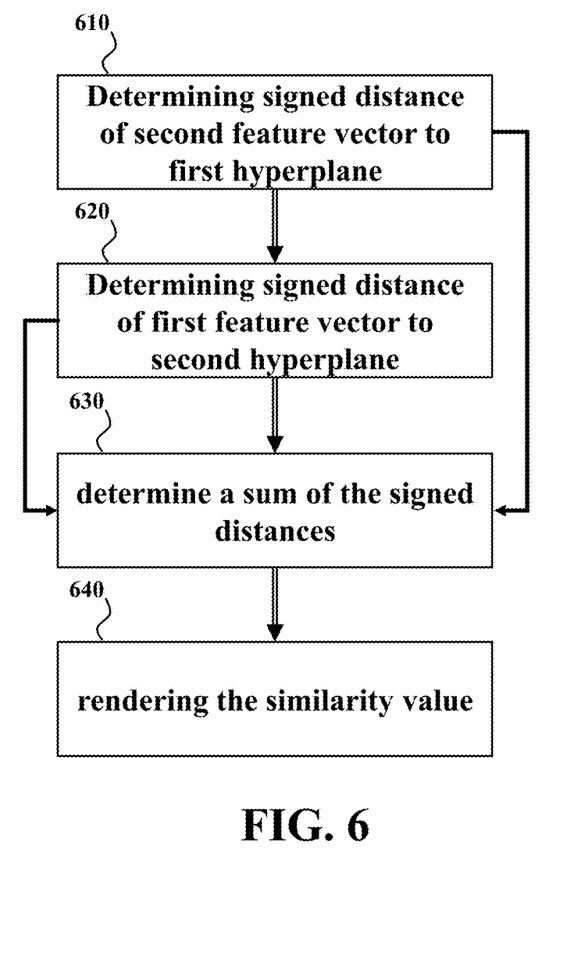
FIG. 6 shows a flow chart of a method for determining the similarity measure according to one embodiment.

FIG. 6 shows a flow chart of a method for determining the similarity measure according to one embodiment. The method determines 610 a signed distance of the second feature vector to the first hyperplane and determines 620 a signed distance of the first feature vector to the second hyperplane. The method sums 630 those signed distances and renders 640 a function of a sum of a signed distance of the second feature vector to the first hyperplane and a signed distance of the first feature vector to the second hyperplane as the similarity value indicative of the similarity of the first and the second images.

Figure 7:
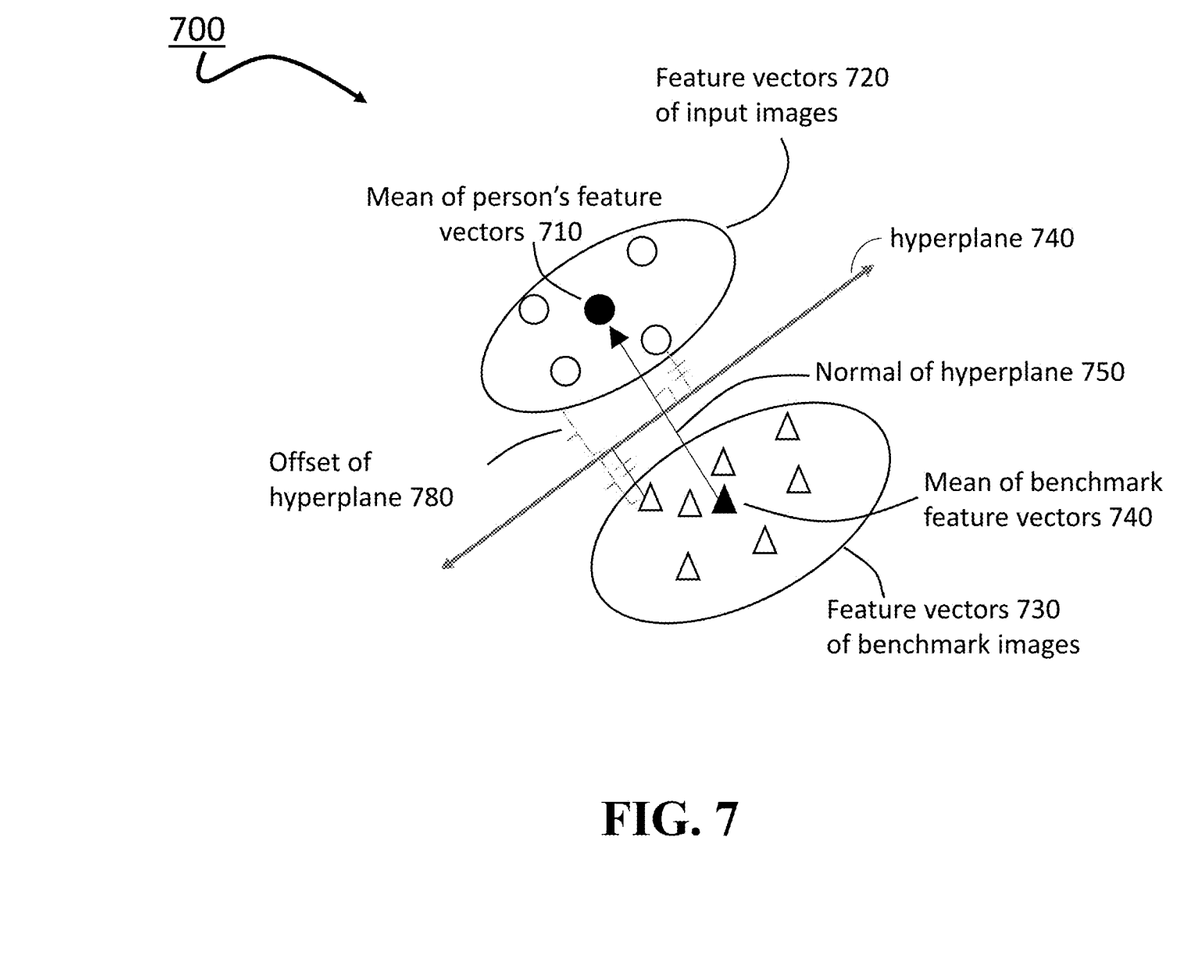
FIG. 7 shows a schematic of determining a hyperplane for a set of images represented with a plurality of feature vectors according to one embodiment.

FIG. 7 shows a schematic of determining a hyperplane for a set of images represented with a plurality of feature vectors according to one embodiment. In some cases, in which a person is being identified, multiple images of that person may be available. For example, multiple images of a person may come from the frames of a video sequence of a person. In such cases, the computation of similarity using hyperplanes can take advantage of all available images of a person at once to improve accuracy. This requires a straightforward modification of the method described earlier for comparing single images of two people. To compute a hyperplane that separates a plurality of feature vectors 720 of a person from the benchmark feature vectors 730, the mean feature vector 710 of the person's feature vectors 720 is computed as well as the mean feature vector 740 of the benchmark feature vectors 730. The normal of the hyperplane 750 is the computed as the difference of the person's mean feature vector 710 minus the mean feature vector of the benchmark feature vectors 740. The offset of the hyperplane 780 is computed as the average of the minimum inner product of all of the person's feature vectors 720 with the normal of the hyperplane 750 and the maximum inner product of all the benchmark feature vectors 730 with the normal of the hyperplane 750.

To compare a first set of images with a second set of images, two hyperplanes are computed. A first hyperplane separating feature vectors of the first set of images from the benchmark feature vectors is computed as described above. A second hyperplane separating feature vectors of the second set of images from the benchmark feature vectors is also computed as described above. Then a signed distance between the first and second sets of images is computed as the average signed distance of feature vectors of the first set of images to the second hyperplane plus the average signed distance of feature vectors of the second set of images to the first hyperplane. The signed distance of a feature vector to a hyperplane is computed as the inner product of the feature vector with the normal of the hyperplane minus the offset of the hyperplane. Notably, in the previous examples, the first set of images and/or the second set of images include just a single image, i.e., the size of the first set of images and/or the size of the second set of images equals one.

Figure 8:
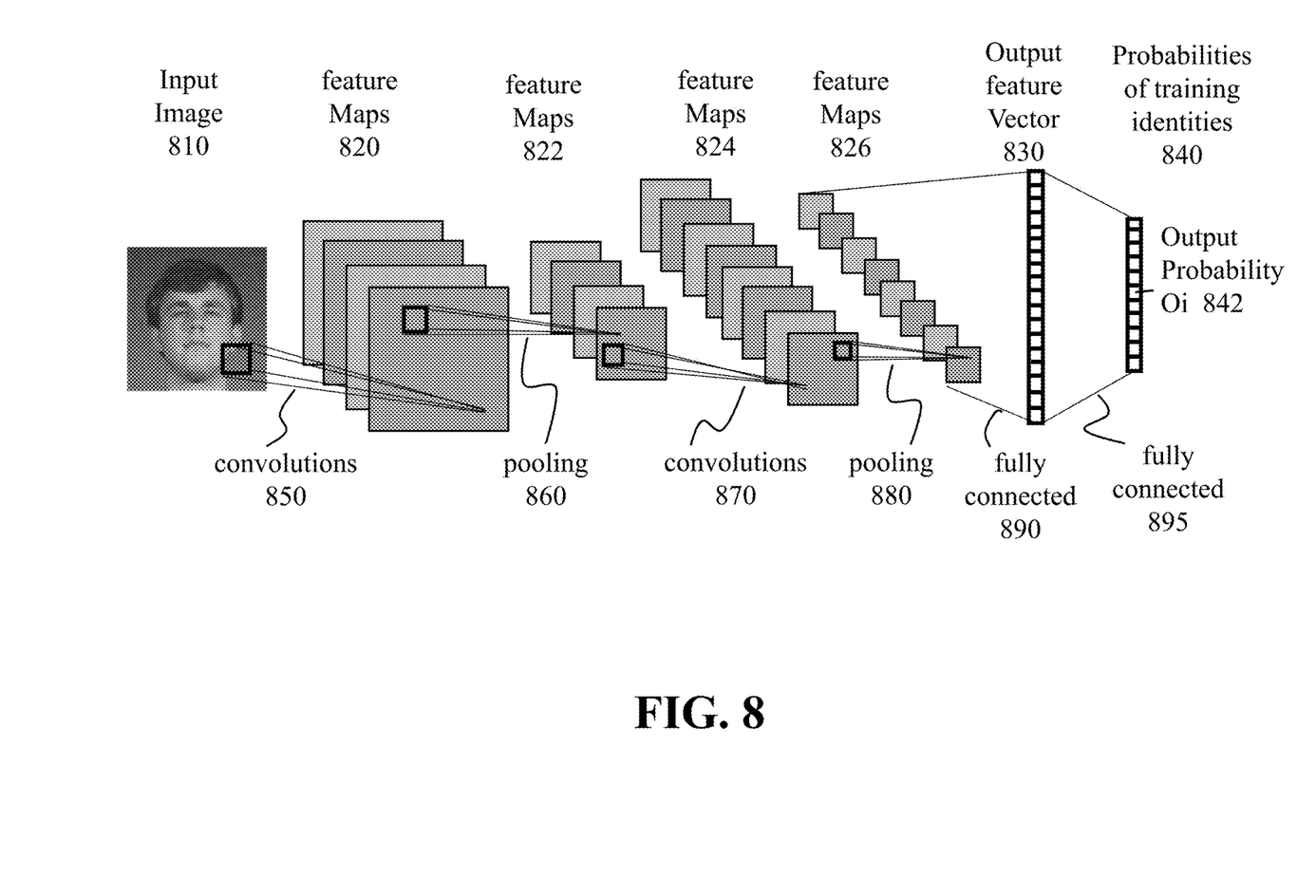
FIG. 8 shows a diagram that represents an exemplar neural network used by some embodiments to produce feature vectors.

FIG. 8 shows a diagram that represents an exemplar neural network used by some embodiments to produce feature vectors. The network includes an input layer that takes one or more images as input 810. This is followed by a sequence of convolutional and pooling layers 850,860, 870,880. Convolutional layers convolve their input with a set of convolution matrices. Each convolution matrix is used to compute a different output image often called a feature map. The elements of the convolutional matrices are learned during training. Nonlinear functions (such as rectified linear functions or sigmoidal functions) are often applied to the feature maps to produce new feature maps. Pooling layers subsample their inputs and output smaller, subsampled feature maps. A convolutional neural network may have any number of convolutional or pooling layers in any order. A convolutional neural network often (but not always) ends with one or more fully connected layers 890, 895. The parameters of the fully connected layers are also learned during training. In some embodiments, the penultimate layer of a convolutional neural network is a one dimensional vector often called a feature vector 830. In some embodiments, during training the ultimate layer of the convolutional neural network 840 is a vector of probabilities indicating the probability that the input image belongs to each of the different training classes. The vector of probabilities is typically generated by computing a softmax function of the vector of numbers computed as different linear combinations of the feature vector. When training a face recognition network, the training classes are the set of different identities in the training set of face images.

In some implementations, a convolutional neural network is trained using a stochastic gradient descent algorithm that minimizes a user-defined loss function. For example, for a face recognition network, the user-defined loss function may be the Euclidean distance between output probabilities of the network and the ground truth probabilities of the training face images.

During training, for final output unit $O_i$ 842, the weights of the last fully connected layer of the network connected to $O_i$ 842 learn a linear function that tries to map feature vectors for images of person i to 1 and feature vectors for images of all other people to −1. This means that the weights of the last fully connected layer define a separating hyperplane between images of person i and images of all other people. This also implies that the feature vectors learned by the network have the property that the feature vectors for images of a particular identity are linearly separable from the feature vectors of all other people. These feature vectors do not necessarily have the property that the feature vectors for a particular identity are all close together. However, during testing, the similarity function that is usually used between two feature vectors is negative L2 distance which means that two feature vectors that come from two images of the same person should have small L2 distance (i.e., be close together). However, this is not what the neural network is being trained for. Having each class of face images be linearly separable from all other classes does not imply that all the feature vectors for a class have small L2 distance. To that end, it is advantageous to devise a new similarity function to measure the similarity of sets of images of two people based on measuring the distances to hyperplanes that separate the feature vectors of the person images from a set of benchmark feature vectors representing images of other people not being tested.

Figure 9:
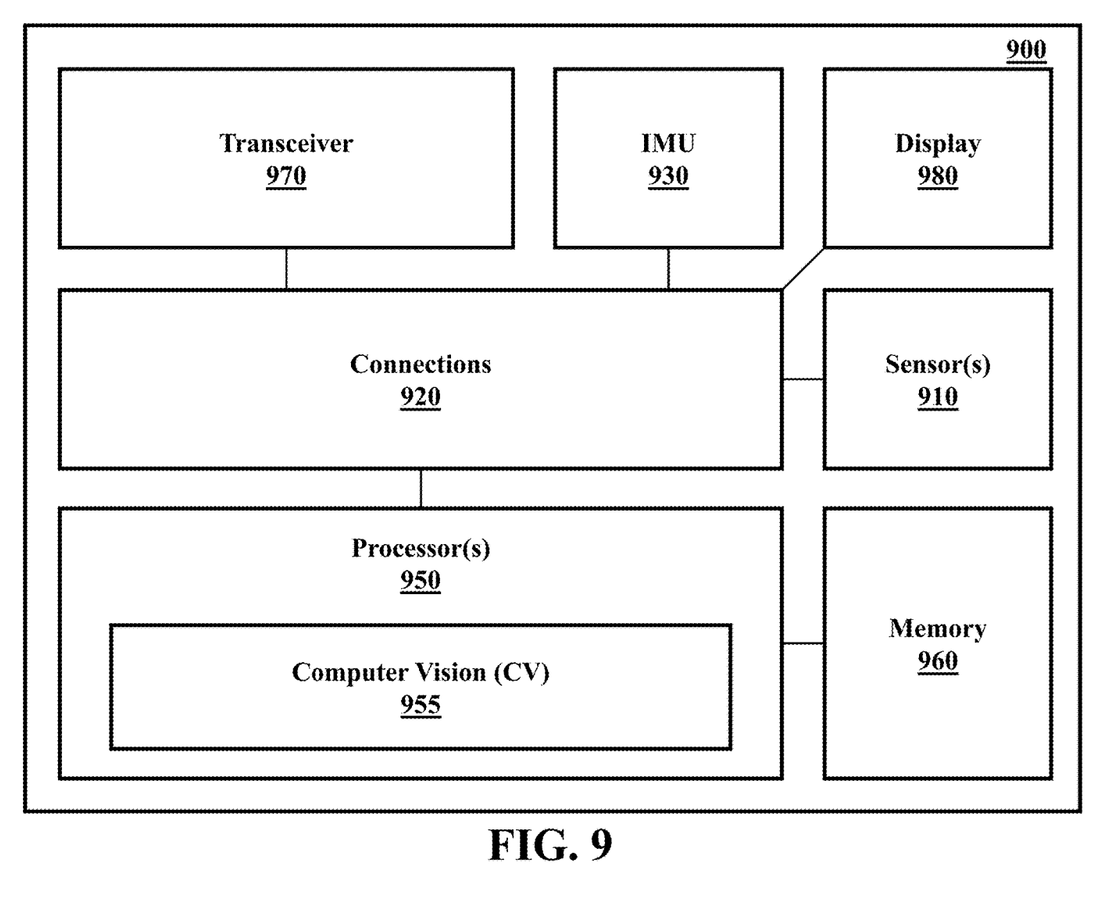
FIG. 9 shows a block diagram of an exemplary system configured for image processing and computer vision applications according to some embodiments.

FIG. 9 shows a block diagram of an exemplary system 900 configured for image processing and computer vision applications according to some embodiments. The system 900 can include one or combination of a camera 910, an inertial measurement unit (IMU) 930, a processor 950, a memory 960, a transceiver 970, and a display/screen 980, which can be operatively coupled to other components through connections 920. The connections 920 can comprise buses, lines, fibers, links or combination thereof.

The transceiver 970 can, for example, include a transmitter enabled to transmit one or more signals over one or more types of wireless communication networks and a receiver to receive one or more signals transmitted over the one or more types of wireless communication networks. The transceiver 970 can permit communication with wireless networks based on a variety of technologies such as, but not limited to, femtocells, Wi-Fi networks or Wireless Local Area Networks (WLANs), which may be based on the IEEE 802.11 family of standards, Wireless Personal Area Networks (WPANS) such Bluetooth, Near Field Communication (NFC), networks based on the IEEE 802.15x family of standards, and/or Wireless Wide Area Networks (WWANs) such as LTE, WiMAX, etc. The system 900 can also include one or more ports for communicating over wired networks.

In some embodiments, the system 900 can comprise image sensors such as CCD or CMOS sensors, lasers and/or camera 910, which are hereinafter referred to as "sensor 910". For example, the sensor 910 can convert an optical image into an electronic or digital image and can send acquired images to processor 950. Additionally, or alternatively, the sensor 910 can sense the light reflected from a target object in a scene and submit the intensities of the captured light to the processor 950.

For example, the sensor 910 can include color or grayscale cameras, which provide "color information." The term "color information" as used herein refers to color and/or grayscale information. In general, as used herein, a color image or color information can be viewed as comprising 1 to N channels, where N is some integer dependent on the color space being used to store the image. For example, an RGB image comprises three channels, with one channel each for Red, Blue and Green information.

For example, the sensor 910 can include a depth sensor for providing "depth information." The depth information can be acquired in a variety of ways using depth sensors. The term "depth sensor" is used to refer to functional units that may be used to obtain depth information independently and/or in conjunction with some other cameras. For example, in some embodiments, the depth sensor and the optical camera can be part of the sensor 910. For example, in some embodiments, the sensor 910 includes RGBD cameras, which may capture per-pixel depth (D) information when the depth sensor is enabled, in addition to color (RGB) images.

As another example, in some embodiments, the sensor 910 can include a 3D Time of Flight (3DTOF) camera. In embodiments with 3DTOF camera, the depth sensor can take the form of a strobe light coupled to the 3DTOF camera, which can illuminate objects in a scene and reflected light can be captured by a CCD/CMOS sensor in the sensor 910. Depth information can be obtained by measuring the time that the light pulses take to travel to the objects and back to the sensor.

As a further example, the depth sensor can take the form of a light source coupled to the sensor 910. In one embodiment, the light source projects a structured or textured light pattern, which can include one or more narrow bands of light, onto objects in a scene. Depth information is obtained by exploiting geometrical distortions of the projected pattern caused by the surface shape of the object. One embodiment determines depth information from stereo sensors such as a combination of an infra-red structured light projector and an infra-red camera registered to a RGB camera.

In some embodiments, the sensor 910 includes stereoscopic cameras. For example, a depth sensor may form part of a passive stereo vision sensor, which may use two or more cameras to obtain depth information for a scene. The pixel coordinates of points common to both cameras in a captured scene may be used along with camera pose information and/or triangulation techniques to obtain per-pixel depth information.

In some embodiments, the system 900 can be operatively connected to multiple sensors 910, such as dual front cameras and/or a front and rear-facing cameras, which may also incorporate various sensors. In some embodiments, the sensors 910 can capture both still and video images. In some embodiments, the sensor 910 can include RGBD or stereoscopic video cameras capable of capturing images at, e.g., 30 frames per second (fps). In one embodiment, images captured by the sensor 910 can be in a raw uncompressed format and can be compressed prior to being processed and/or stored in memory 960. In some embodiments, image compression can be performed by the processor 950 using lossless or lossy compression techniques.

In some embodiments, the processor 950 can also receive input from IMU 930. In other embodiments, the IMU 930 can comprise 3-axis accelerometer(s), 3-axis gyroscope(s), and/or magnetometer(s). The IMU 930 can provide velocity, orientation, and/or other position related information to the processor 950. In some embodiments, the IMU 930 can output measured information in synchronization with the capture of each image frame by the sensor 910. In some embodiments, the output of the IMU 930 is used in part by the processor 950 to fuse the sensor measurements and/or to further process the fused measurements.

The system 900 can also include a screen or display 980 rendering images, such as color and/or depth images. In some embodiments, the display 980 can be used to display live images captured by the sensor 910, fused images, such as the image 335, augmented reality (AR) images, graphical user interfaces (GUIs), and other program outputs. In some embodiments, the display 980 can include and/or be housed with a touchscreen to permit users to input data via some combination of virtual keyboards, icons, menus, or other GUIs, user gestures and/or input devices such as styli and other writing implements. In some embodiments, the display 980 can be implemented using a liquid crystal display (LCD) display or a light emitting diode (LED) display, such as an organic LED (OLED) display. In other embodiments, the display 980 can be a wearable display.

In some embodiments, the result of the fusion can be rendered on the display 980 or submitted to different applications that can be internal or external to the system 900. For example, a computer vision (CV) application 955 running on the processor 950 can implement and execute computer vision based tracking, model-based tracking, and/or simultaneous localization and mapping (SLAM) methods.

Exemplary system 900 can also be modified in various ways in a manner consistent with the disclosure, such as, by adding, combining, or omitting one or more of the functional blocks shown. For example, in some configurations, the system 900 does not include the IMU 930 or the transceiver 970. Further, in certain example implementations, the system 900 include a variety of other sensors (not shown) such as an ambient light sensor, microphones, acoustic sensors, ultrasonic sensors, laser range finders, etc. In some embodiments, portions of the system 900 take the form of one or more chipsets, and/or the like.

The processor 950 can be implemented using a combination of hardware, firmware, and software. The processor 950 can represent one or more circuits configurable to perform at least a portion of a computing procedure or process related to sensor fusion and/or methods for further processing the fused measurements. The processor 950 retrieves instructions and/or data from memory 960. The processor 950 can be implemented using one or more application specific integrated circuits (ASICs), central and/or graphical processing units (CPUs and/or GPUs), digital signal processors (DSPs), digital signal processing devices (DSPDs), programmable logic devices (PLDs), field programmable gate arrays (FPGAs), controllers, micro-controllers, microprocessors, embedded processor cores, electronic devices, other electronic units designed to perform the functions described herein, or a combination thereof.

The memory 960 can be implemented within the processor 950 and/or external to the processor 950. As used herein the term "memory" refers to any type of long term, short term, volatile, nonvolatile, or other memory and is not to be limited to any particular type of memory or number of memories, or type of physical media upon which memory is stored. In some embodiments, the memory 960 holds program codes that facilitate sensor fusion and/or one or more image processing, perform SLAM, tracking, 3D reconstruction, and other tasks performed by CV 955 on processor 950.

For example, the memory 960 can store the measurements of the sensors, such as still images, depth information, video frames, program results, as well as data provided by the IMU 930 and other sensors. In general, the memory 960 can represent any data storage mechanism. The memory 960 can include, for example, a primary memory and/or a secondary memory. The primary memory can include, for example, a random access memory, read only memory, etc. While illustrated in FIG. 9 as being separate from the processors 950, it should be understood that all or part of a primary memory can be provided within or otherwise co-located and/or coupled to the processors 950.

Secondary memory can include, for example, the same or similar type of memory as primary memory and/or one or more data storage devices or systems, such as, for example, flash/USB memory drives, memory card drives, disk drives, optical disc drives, tape drives, solid state drives, hybrid drives etc. In certain implementations, secondary memory can be operatively receptive of, or otherwise configurable to a non-transitory computer-readable medium in a removable media drive (not shown). In some embodiments, the non-transitory computer readable medium forms part of the memory 960 and/or the processor 950.

In some embodiments, the CV 955 can implement various computer vision methods and/or process images captured by the sensor 910. For example, the CV 955 can be configured for processing one or more images captured by the sensor 910 to perform reconstruction of an environment being modeled using the depth information associated with the captured images.

Based on the depth data, during reconstruction each pixel can be assigned a 3D coordinate. In one embodiment, the CV 955 on the processor 950 tracks the position of the camera 910 by using a monocular (single camera) visual SLAM system to build a coarse map of the environment around the MS for accurate and robust 6DOF tracking of camera 910. The term monocular refers to the use of a single non-stereoscopic camera to capture images or to images captured without depth information. Other reconstruction method can then use the camera pose and per-pixel depth information to extrude the captured image(s) along a viewing direction. For example, in one embodiment the processor 950 is configured to track an object in the scene using the fused set of measurements.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention.

Therefore, it is the object of the appended claims to cover all such variations and modifications as come within the true spirit and scope of the invention.

I claim:

1. An image processing system, comprising:
a memory to store data indicative of benchmark feature vectors of benchmark images;
an input interface to accept data indicative of a first feature vector of a first image and a second feature vector of a second image, wherein the benchmark images do not include the first image and the second image;
a processor to determine a similarity value between the first and the second images using a first hyperplane separating the benchmark feature vectors from the first feature vector and a second hyperplane separating the benchmark feature vectors from the second feature vector, wherein the processor is configured to
determine a first normal vector to the first hyperplane as the difference between the first feature vector and the mean of the benchmark feature vectors;
determine an offset for the first hyperplane as the average of the maximum inner product of the benchmark feature vectors with the first normal vector and the inner product of the first feature vector with the first normal vector; and
determine the similarity value as a function of a sum of a signed distance of the second feature vector to the first hyperplane and a signed distance of the first feature vector to the second hyperplane; and
an output interface to render the similarity value.

2. The system of claim 1, wherein the processor is further configured to
determine a second normal vector to the second hyperplane as the difference between the second feature vector and the mean of the benchmark feature vectors;
determine an offset for the second hyperplane as the average of the maximum inner product of the benchmark feature vectors with the second normal vector and the inner product of the second feature vector with the second normal vector; and
determine the second hyperplane intersecting the second normal vector at the offset from the second feature vector.

3. The system of claim 1, wherein the second hyperplane is predetermined using a linear support vector machine (SVM) solver.

4. The system of claim 1, wherein the input interface accepts data indicative of a first set of feature vectors of a first set of images and a second set of feature vectors of a second set of images, wherein the benchmark images do not include the first set of images and the second set of images, wherein the processor
determines the first normal vector to the first hyperplane as the difference between the mean of the first set of feature vectors and the mean of the benchmark feature vectors;
determine the offset for the first hyperplane as the average of the maximum inner product of the benchmark feature vectors with the first normal vector and the minimum inner product of the feature vectors from the first set of feature vectors with the first normal vector;
determines the second normal vector to the second hyperplane as the difference between the mean of the second set of feature vectors and the mean of the benchmark feature vectors;
determine the offset for the second hyperplane as the average of the maximum inner product of the benchmark feature vectors with the second normal vector and the minimum inner product of the feature vectors from the second set of feature vectors with the second normal vector.

5. The system of claim 1, wherein the processor uses a neural network to process the first image to produce the first feature vector.

6. The system of claim 5, wherein the processor uses the neural network to process the second image to produce the second feature vector.

7. The system of claim 6, wherein the processor uses the neural network to process the benchmark images to produce the benchmark feature vectors.

8. The system of claim 1, wherein the first image, the second image, and the benchmark images are images of faces, thereby making the system a face recognition system.

9. The system of claim 1, further comprising:
a device operated based on the similarity value.

10. An image processing method, wherein the method uses a processor coupled to a memory storing data indicative of benchmark feature vectors of benchmark images, wherein the processor is coupled with stored instructions implementing the method, wherein the instructions, when executed by the processor carry out at least some steps of the method, comprising:
accepting data indicative of a first set of feature vectors of a first set of images and a second set of feature vectors of a second set of images, wherein the benchmark images do not include the first set of images and the second set of images;
comparing a first hyperplane separating the benchmark feature vectors from the first set of feature vectors with a second hyperplane separating the benchmark feature vectors from the second set of feature vectors to produce a similarity value between the first and the second set of images, wherein the comparing comprises
determining a first normal vector to the first hyperplane as difference between the mean of the first set of feature vectors and the mean of the benchmark feature vectors;
determining an offset for the first hyperplane as an average of the maximum inner product of the benchmark feature vectors with the first normal vector and the minimum inner product of the feature vectors from the first set of feature vectors with the first normal vector; and
determining the similarity value as a function of an average signed distance of the all feature vectors in the second set of feature vectors to the first hyperplane; and
rendering the similarity value.

11. The method of claim 10, wherein the first set of images includes only one image.

12. The method of claim 10, further comprising:
determining a second normal vector to the second hyperplane as difference between the mean of the second set of feature vectors and the mean of the benchmark feature vectors;
determining an offset for the second hyperplane as an average of the maximum inner product of the benchmark feature vectors with the second normal vector and the minimum inner product of the feature vectors from the second set of feature vectors with the second normal vector.

13. The method of claim 12, wherein the second set of images includes only one image.

14. The method of claim 1, wherein the benchmark feature vectors, the first set of feature vectors, and the second set of feature vectors are produced by a neural network.

15. A non-transitory computer readable storage medium embodied thereon a program executable by a processor for performing a method, the method comprising:
  accepting data indicative of a first set of feature vectors of a first set of images, a second set of feature vectors of a second set of images, and benchmark feature vectors of benchmark images, wherein the benchmark images do not include the first set of images and the second set of images;
  comparing a first hyperplane separating the benchmark feature vectors from the first set of feature vectors with a second hyperplane separating the benchmark feature vectors from the second set of feature vectors to produce a similarity value between the first and the second set of images; and
  rendering the similarity value, wherein the comparing comprises
    determining a first normal vector to the first hyperplane as difference between the mean of the first set of feature vectors and the mean of the benchmark feature vectors;
    determining an offset for the first hyperplane as an average of the maximum inner product of the benchmark feature vectors with the first normal vector and the minimum inner product of the feature vectors from the first set of feature vectors with the first normal vector; and
    determining the similarity value as a function of an average signed distance of the all feature vectors in the second set of feature vectors to the first hyperplane.

\* \* \* \* \*